A. GOODYEAR, 2d.
Harvester-Droppers.
No. 147,933.  Patented Feb. 24, 1874.
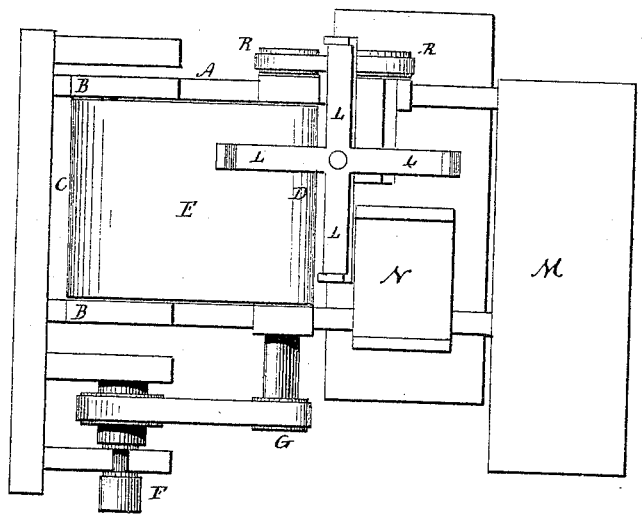
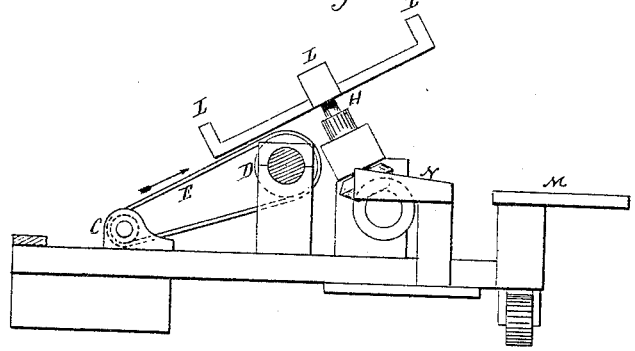

UNITED STATES PATENT OFFICE.

ALBERT GOODYEAR, 2D, OF HAMDEN, CONNECTICUT, ASSIGNOR TO ALFRED GOODYEAR, OF SAME PLACE.

IMPROVEMENT IN HARVESTER-DROPPERS.

Specification forming part of Letters Patent No. 147,933, dated February 24, 1874; application filed January 21, 1874.

*To all whom it may concern:*

Be it known that I, ALBERT GOODYEAR, 2d, of Hamden, in the county of New Haven and State of Connecticut, have invented a new Improvement in Reapers; and I do hereby declare the following, when taken in connection with the accompanying drawings and the letters of reference marked thereon, to be a full, clear, and exact description of the same, and which said drawings constitute part of this specification, and represent, in—

Figure 1, a top view, and in Fig. 2 a side view.

This invention relates to an improvement in device for gathering the grain as it falls from the cutters of a reaping-machine into a condition for bundling; and it consists in an endless apron arranged in the rear of the cutter-bar, and moving directly back therefrom, combined with a revolving sweep, which will collect the grain upon the apron as it falls, and cause it to be carried onto a table on the machine, or to the earth through a suitable conductor, as the case may be.

A A are two sides of the frame-work attached by suitable devices to the cutter-bar. On this frame, in bearings B, a shaft, C, is arranged parallel with the cutter-bar, and as near the cutter-bar as convenience will allow. To the rear of this shaft, and elevated from the frame, is a second shaft, D, parallel with the first. Around these two shafts is arranged an endless apron, E. The power is communicated to cause the revolution of the shaft through a counter-pulley, F, and thence, by a belt or gear, to a pulley, G, and shaft D, so that in motion the upper run of the apron travels back from the cutter-bar. In the rear of this apron a shaft, H, is arranged in a position vertical to the rim of the apron E, and upon this shaft sweeps L, more or less in number, are arranged, so that, as the shaft H is caused to revolve, these sweeps will pass over the surface of the apron; therefore, as the grain from the cutters falls back upon the apron, it will be carried up and back by the movement of the apron, and be gathered at one edge by the revolving sweeps, the shaft H being set as shown in Fig. 1, so that the sweeps will reach to the extreme right of the apron, and leave the apron short of the extreme left. This will gather the grain upon the extreme left of the apron, and by the apron be carried over onto the bundling-table N, there to be bound by the binder, who sits upon the seat M; or, if not desired to be bound on the machine, a conductor may be arranged in place of the seat to lead the grain directly to the earth as it passes from the apron. Power is communicated to the sweep-shaft from the shaft D by means of pulleys or gearing R R.

I claim as my invention—

The combination of the endless apron E and the revolving sweeps L, substantially in the manner and for the purpose specified.

ALBERT GOODYEAR, 2D.

Witnesses:
A. J. TIBBITS,
J. H. SHUMWAY.